(No Model.)
J. K. KARR.
GRAIN CARRIER.
No. 486,717.  Patented Nov. 22, 1892.
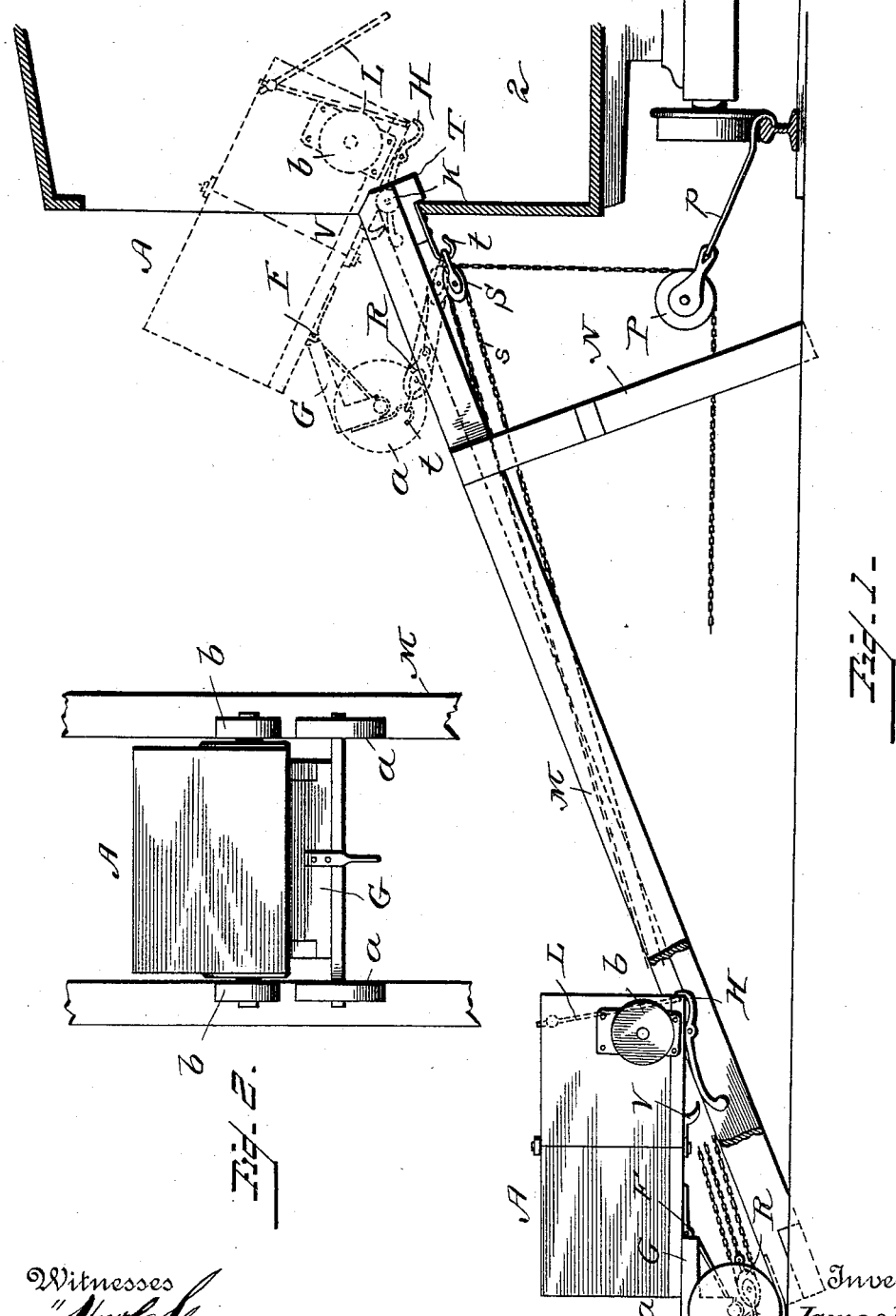
Witnesses
Inventor
James K. Karr.
By Attorneys

UNITED STATES PATENT OFFICE.

JAMES KNOX KARR, OF LA CROSSE, WISCONSIN.

GRAIN-CARRIER.

SPECIFICATION forming part of Letters Patent No. 486,717, dated November 22, 1892.

Application filed August 12, 1892. Serial No. 442,870. (No model.)

*To all whom it may concern:*

Be it known that I, JAMES KNOX KARR, a citizen of the United States, residing at La Crosse, in the county of La Crosse, State of Wisconsin, have invented certain new and useful Improvements in Grain-Carriers; and I do hereby declare the following to be a full, clear, and exact description of the invention, such as will enable others skilled in the art to which it appertains to make and use the same.

My invention relates to improved means for carrying grain from a wagon and emptying the same into a car, crib, granary, &c.

The improvement consists of the novel features and the peculiar construction and combination of the parts which will be hereinafter more fully described and claimed, and which are shown in the annexed drawings, in which—

Figure 1 is a side elevation showing the application of the invention, the car being shown in full lines at the lower end of the incline track and by dotted lines at the upper end of said track and in a tilted position. Fig. 2 is a rear end view of the grain carrier or car.

The incline track on which the car A is adapted to travel is represented by the letter M and is strengthened between its ends by the brace N. The lower end of the incline track M is provided with upwardly-inclined guards $n$, which are adapted to engage with the rear wheels $a$ and sustain the car in a normal position while being loaded. The upper end of the incline track is provided with small wheels K and with a cross-bar T, to which a hook $t$ is attached to form means of connection with said cross-head T of the pulley-block S, around which the operating-cable $s$ passes. This cable $s$ is operated by suitable power and passes around guide-pulley P, which is suitably anchored, preferably to the rail, by grab-hook $p$. The sheave-block R, around which the cable $s$ also passes, is connected to a hook $t$, which is attached to the rear axle of the car A.

The car A may be of any desired construction and is closed at its front or delivery end by a gate L, which is pivotally connected at its upper end with the sides of the car and which is adapted to swing outwardly at its lower end, being held in a closed position by a weighted catch H. This car is mounted upon wheels $h$ and B, which are so disposed that said car will at all times occupy a relatively-horizontal position. To effect this result, the wheels D are at a relatively-higher level than the wheels $a$, and for the sake of simplicity are applied to the sides of said car. The wheels $a$ are carried by a brace-frame G, which is pivoted at its front end to the car at the point F and is designed to permit the car to tilt while the wheels $a$ remain on the track. The stop V provided on the under side of the car is adapted to engage with the axle of the wheels K or other convenient portion of the incline track M to prevent the car leaving or shooting over the upper end of the said incline track M.

The granary, bin, or car into which it is desired to empty the grain is represented by the numeral 2, and the incline track M is so disposed that its upper end projects slightly into the opening through which the car enters when about to dump the grain. The car A when at the lower end of the incline track is loaded with grain or other substance in any convenient manner, and after being loaded is drawn up the incline track M by power applied to the cable $s$. As the car approaches the upper end of the incline track M the wheels B will leave the track and the front portion of said car will be sustained and carried by the wheels K. The stop V, engaging with a portion of the incline track, forms the fulcrum about which the car tilts, and a continued pull on the cable $s$ draws the wheels $a$ under the car and elevates the rear end thereof, and at the same time the weighted end of the catch H, engaging with a portion of the incline track M, is pressed upward and releases the door L, which opening outward under the pressure of the grain the latter is emptied into the granary, car 2, &c., as will be readily understood on reference to the dotted lines in Fig. 1. After the car has been emptied the cable $s$ is slackened, the wheels $a$ begin to ride down the incline track M, the car A resumes its horizontal position, the door L closes, and the catch H assumes its normal position and secures the door L.

Having thus described my invention, what I claim, and desire to secure by Letters Patent, is—

1. In a means for carrying and emptying grain, the combination, with an incline track, of a car mounted on wheels which are located at relatively-different elevations whereby the car will maintain a horizontal position, a frame hinged at one end to said car and carrying the rear wheels, and a cable for moving said car on the incline track, adapted to be attached to said hinged frame, whereby the power is applied to said car through said hinged frame, substantially as set forth.

2. The combination, with an incline track having wheels $a$ at its upper end, of a car mounted on wheels, which are located at relatively-different elevations, a stop located between the ends of said car and adapted to engage with the upper portion of the platform and form a fulcrum for the car to tilt upon, a frame G, hinged at one end to the car and carrying the rear wheels, and a cable attached to said frame G and adapted to transmit the power to the car for moving the same on the track and tilting the car, substantially as set forth.

3. The herein shown and described means for conveying and emptying grain into a suitable receptacle, consisting of an inclined track braced between its ends and having upwardly-curved guards $m$ at its lower end and a cross-bar and wheels K at its upper end, a car adapted to travel on said track and mounted on wheels which are located at relatively-different elevations, a hinged door L to close one end of the car, a weighted catch H to secure the lower end of said door L, a stop V, depending from the car and adapted to form a fulcrum about which said car tilts, a brace-frame G, hinged at one end to the car and carrying the rear wheels, and block and tackle, substantially as shown, for elevating and moving said car on the track M, substantially as set forth.

In testimony whereof I affix my signature in presence of two witnesses.

JAMES KNOX KARR.

Witnesses:
EMMA PALECSK,
T. STERN.